United States Patent
Duncan Ho et al.

(10) Patent No.: US 7,212,503 B2
(45) Date of Patent: *May 1, 2007

(54) CONTROL-HOLD MODE

(75) Inventors: Sai Yiu Duncan Ho, San Diego, CA (US); Yongbin Wei, San Diego, CA (US); Ragulan Sinnarajah, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 507 days.

This patent is subject to a terminal disclaimer.

(21) Appl. No.: 10/763,736

(22) Filed: Jan. 22, 2004

(65) Prior Publication Data

US 2004/0157651 A1  Aug. 12, 2004

Related U.S. Application Data

(63) Continuation of application No. 10/042,873, filed on Jan. 8, 2002, now Pat. No. 6,717,924.

(51) Int. Cl.
H04Q 7/32 (2006.01)
H04Q 7/38 (2006.01)

(52) U.S. Cl. .................. 370/311; 370/349; 370/318; 455/522

(58) Field of Classification Search ........... 370/310, 370/311, 317, 318, 331, 332, 335, 342, 349, 370/441, 431; 455/436–444, 13.3, 522, 574
See application file for complete search history.

(56) References Cited

U.S. PATENT DOCUMENTS 4,901,307 A   2/1990   Gilhousen et al.

(Continued)

FOREIGN PATENT DOCUMENTS

WO   9941853   8/1999

(Continued)

OTHER PUBLICATIONS

"Description of the DV Control Hold Mode;" Memo from Ericsson, Motorola, Nortel and Samsung, published Jan. 7, 2002 (pp. 1-10).

(Continued)

*Primary Examiner*—Ajit Patel
(74) *Attorney, Agent, or Firm*—Thomas R. Rouse; Thien T. Nguyen; Ramin Mobarhan

(57) ABSTRACT

Methods and apparatus are presented for implementing an improved Control-Hold Mode that reduces the load of the reverse link and reduces the battery consumption of remote stations. While a remote station is in the improved Control-Hold Mode, the circuitry that monitors the forward packet data channels and the associated control channels are turned off. Since the forward packet data channels and their associated control channels are not monitored, the operations of the reverse channels can be gated off to predetermined duty cycles, or set on intermittent transmission modes, or shut down completely. Transitions from the Control-Hold Mode to the Active Mode can be initiated by the remote station or by a base station. When a transition is initiated by a remote station, the remote station transmits a signaling message to a serving base station and then starts operating the feedback channels before actually receiving forward link signals.

4 Claims, 5 Drawing Sheets

U.S. PATENT DOCUMENTS

| | | |
|---|---|---|
| 5,103,459 A | 4/1992 | Gilhousen et al. |
| 5,757,772 A * | 5/1998 | Thornberg et al. ........... 370/236 |
| 5,903,558 A * | 5/1999 | Jones et al. .................. 370/351 |
| 5,987,012 A | 11/1999 | Bruckert et al. |
| 6,249,681 B1 * | 6/2001 | Virtanen ...................... 455/466 |
| 6,434,367 B1 | 8/2002 | Kumar et al. |
| 6,473,419 B1 | 10/2002 | Gray et al. |
| 2003/0117969 A1 | 6/2003 | Koo et al. |
| 2003/0130002 A1 | 7/2003 | Chen et al. |
| 2003/0166408 A1 | 9/2003 | Zhang et al. |

FOREIGN PATENT DOCUMENTS

| | | |
|---|---|---|
| WO | 9953695 | 10/1999 |
| WO | 9956405 | 11/1999 |

OTHER PUBLICATIONS

Steve Dennett, The CDMA2000 ITU-R RTT Candidate Submission (0.18); Telecommunications Industry Association (TIA), Jul. 27, 1998, pp. 1-311.

* cited by examiner

CONTROL-HOLD MODE

CLAIM OF PRIORITY UNDER 35 U.S.C. §120

The present Application for Patent is a Continuation and claims priority to patent application Ser. No. 10/042,873 entitled "CONTROL-HOLD MODE" filed Jan. 8, 2002, now U.S. Pat. No. 6,717,924, and assigned to the assignee hereof and hereby expressly incorporated by reference herein.

BACKGROUND

1. Field

The present invention relates generally to communications, and more specifically, to reducing the load of the reverse link and the power consumption of remote stations.

2. Background

The field of wireless communications has many applications including, e.g., cordless telephones, paging, wireless local loops, personal digital assistants (PDAs), Internet telephony, and satellite communication systems. A particularly important application is cellular telephone systems for remote subscribers. As used herein, the term "cellular" system encompasses both cellular and personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA and 3GPP2. Another CDMA standard is the W-CDMA standard, as embodied in $3^{rd}$ Generation Partnership Project "3GPP," Document Nos. 3G TS 25.211, 3G TS 25.212, 3G TS 25.213, and 3G TS 25.214.

The telecommunication standards cited above are examples of only some of the various communications systems that can be implemented. Within these various communications systems, multiple users must share limited system resources. In accordance with the actual system implementation, resources such as frequency bandwidth, time, transmission power, or spreading code assignments are typically shared by multiple users within the system. In a FDMA system, the system bandwidth is divided into many frequency channels and each frequency channel is allocated to a user. In a TDMA system, the system bandwidth is divided into many time slots and each time slot is allocated to a user. In a CDMA system, the system bandwidth is simultaneously shared among all users by using spreading codes, wherein each user is assigned a spreading code.

User demand drives the design and development of more efficient systems. The present invention addresses this need by allowing remote stations to individually employ an improved Control-Hold Mode that will reduce the overall load of the reverse link and the power consumption of remote stations. The reverse link comprises the communication channels from the remote stations directed to a base station. The forward link comprises the communication channels from a base station to various remote stations operating within the range of the base station. A remote station that is operating in the improved Control-Hold Mode will not be monitoring nor responding to most of the forward link transmissions from a base station. Hence, when individual remote stations are operating in the improved Control-Hold Mode, the overall load of the reverse link will be reduced.

Moreover, once a remote station enters into the improved Control-Hold Mode, some of the processing circuitry that is utilized for monitoring and responding to forward link signals will be left idle, which immediately and directly impact the power consumption of the remote station. Hence, another benefit of employing the improved Control-Hold Mode will be an increase in the battery life of a remote station.

SUMMARY

Methods and apparatus are presented to address the needs stated above. In one aspect, an apparatus is presented for implementing an improved Control-Hold Mode within a remote station, wherein the remote station operates within a communication system that employs packet data channels with associated control channels, and associated feedback channels, the apparatus comprising: a memory element; and a processing element configured to execute a set of instructions stored in the memory element, the set of instructions for: ceasing the monitoring of packet data channels from a base station; ceasing the monitoring of control channels associated with the packet data channels from the base station; turning off a reverse link acknowledgment channel; gating off transmissions from the remote station to the base station; and intermittently transmitting over a data control channel.

In another aspect, a method is presented for updating an active set when a remote station is in an improved Control-Hold Mode, the method comprising: transmitting a pilot strength measurement to a base station; receiving a signaling message from the base station; transitioning from the improved Control-Hold Mode to an Active Mode, wherein the transitioning is triggered by the signaling message; receiving an acknowledgment message with update information from the base station; updating the active set with the update information from the base station; and transitioning from the Active Mode to the Control-Hold Mode.

In another aspect, a method is presented for a remote station to switch sectors in a base station while the remote station is in a Control-Hold Mode, comprising: determining whether a channel quality indicator channel is presently gated off; if the channel quality indicator channel is not completely gated off, then transmitting a message on the channel quality indicator channel to a different sector; if the channel quality indicator channel is completely gated off, then: transmitting a signaling message on a data control channel to the base station; receiving a forward link acknowledgment message on a common assignment channel; switching to a different sector; and transmitting a reverse link acknowledgment message on the data control channel.

In another aspect, a method is presented for transitioning from an improved Control-Hold Mode to an Active Mode, wherein the transitioning is initiated by a remote station, the method comprising: transmitting a signaling message over a reverse data control channel to a base station while in the improved Control-Hold Mode; starting continuous transmissions over a channel quality indicator channel to the base station; starting the monitoring of a forward packet data channel and an associated control channel; receiving an acknowledgment signal over the forward packet data channel; and starting reverse link transmissions in accordance with the Active Mode.

In another aspect, a method is presented for transitioning a remote station from an improved Control-Hold Mode to an Active Mode, wherein the transitioning is initiated by a base station, the method comprising: transmitting a signaling message over a forward common assignment channel to the remote station, whereupon the signaling message is repeatedly transmitted until an acknowledgment signal is received from the remote station; transmitting an acknowledgment message over a reverse data control channel to the base station from the remote station; activating at least two feedback channels at the remote station; and starting the monitoring of a forward packet data channel and associated control channel at the remote station.

DETAILED DESCRIPTION

Figure 1:
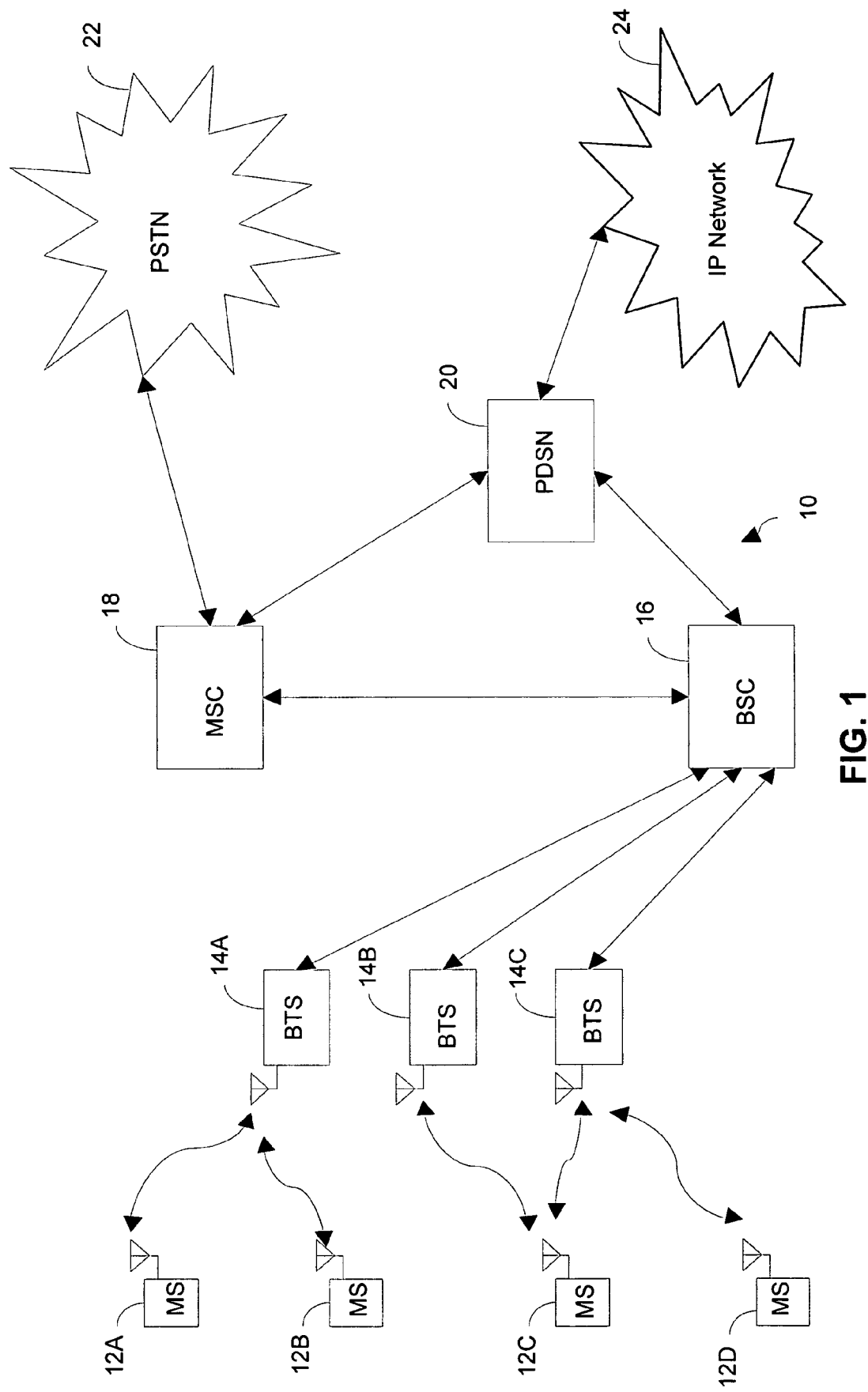
FIG. 1 is a diagram of a wireless communication network.

As illustrated in FIG. 1, a wireless communication network 10 generally includes a plurality of mobile stations (also called remote stations, subscriber units or user equipment) 12a–12d, a plurality of base stations (also called base station transceivers (BTSs) or Node B). 14a–14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four mobile stations 12a–12d, three base stations 14a–14c, one BSC 16, one MSC 18, and one PDSN 20 are shown. It would be understood by those skilled in the art that there could be any number of mobile stations 12, base stations 14, BSCs 16, MSCs 18, and PDSNs 20.

In one embodiment, the wireless communication network 10 is a packet data services network. The mobile stations 12a–12d may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12a–12d may advantageously be configured to perform one or more wireless packet data protocols such as described in, for example, the EIA/TIA/IS-707 standard. In a particular embodiment, the mobile stations 12a–12d generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC 18 is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 is coupled directly to the PDSN 20, and the MSC 18 is not coupled to the PDSN 20.

During typical operation of the wireless communication network 10, the base stations 14a–14c receive and demodulate sets of reverse signals from various mobile stations 12a–12d engaged in telephone calls, Web browsing, or other data communications. Each reverse signal received by a given base station 14a–14c is processed within that base station 14a–14c. Each base station 14a–14c may communicate with a plurality of mobile stations 12a–12d by modulating and transmitting sets of forward signals to the mobile stations 12a–12d. For example, as shown in FIG. 1, the base station 14a communicates with first and second mobile stations 12a, 12b simultaneously, and the base station 14c communicates with third and fourth mobile stations 12c, 12d simultaneously. The resulting packets are forwarded to the BSC 16, which provides call resource allocation and mobility management functionality including the orchestration of soft handoffs of a call for a particular mobile station 12a–12d from one base station 14a–14c to another base station 14a-14c. For example, a mobile station 12c is communicating with two base stations 14b, 14c simultaneously. Eventually, when the mobile station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In some communication systems, packets carrying data traffic are divided into subpackets, which occupy slots of a transmission channel. For illustrative ease only, the nomenclature of a cdma2000 system is used herein. Such use is not intended to limit the implementation of the embodiments herein to cdma2000 systems. Embodiments can be implemented in other systems, such as, e.g., WCDMA, without affecting the scope of the embodiments described herein.

The forward link from the base station to a remote station operating within the range of the base station can comprise a plurality of channels. Some of the channels of the forward link can include, but are not limited to a pilot channel, synchronization channel, paging channel, quick paging channel, broadcast channel, power control channel, assignment channel, control channel, dedicated control channel, medium access control (MAC) channel, fundamental channel, supplemental channel, supplemental code channel, and packet data channel. The reverse link from a remote station to a base station also comprises a plurality of channels. Some of the channels of the reverse link can include, but are not limited to a pilot channel, power control channel, assignment channel, control channel, dedicated control channel, medium access control (MAC) channel, fundamental channel, supplemental channel, acknowledgment channel, and a channel quality indicator channel.

Each channel carries different types of information to the target destination. Typically, voice traffic is carried on fundamental channels, and data traffic is carried on supplemental channels or packet data channels. Supplemental channels are usually dedicated channels, while packet data channels usually carry signals that are designated for different parties in a time and code-multiplexed manner. Alternatively, packet data channels are also described as shared supplemental channels.

Voice traffic and data traffic are typically encoded, modulated, and spread before transmission on either the forward or reverse links. The encoding, modulation, and spreading can be implemented in a variety of formats. In a CDMA system, the transmission format ultimately depends upon the type of channel over which the voice traffic and data traffic are being transmitted and the condition of the channel, which can be described in terms of fading and interference. Transmission parameters can be carried over one or several separate control channels, which can be implemented to transmit occasionally or to transmit each time a data traffic transmission occurs. The receipt of the transmission parameters will allow the decoder to quickly reset the decoding and demodulation settings of certain internal components to the appropriate settings. In addition, the receipt of the transmission parameters on the control channel means that the decoder need not perform time-consuming and resource-consuming calculations for alternative transmission parameters on the data traffic channel.

In addition to control channels and data traffic channels, two feedback channels, such as the acknowledgment (ACK) channel and the channel quality indicator (CQI) channel, can also be implemented. The ACK channel in a cdma2000 1xEVDV system is used on the reverse link to directly acknowledge the receipt of data subpackets on the data traffic channel. The ACK channel is binary phase shift key (BPSK) modulated, wherein one bit, either 0 or 1, indicates whether a subpacket has been accurately decoded or not. The CQI channel is used to signal the need for a new transmission parameters message on a control channel. The channel quality feedback channel is used by the remote station to convey channel quality measurements of the best serving sector to the base station. The channel quality is measured in terms of a carrier-in-interference (C/I) ratio and is based upon received forward link signals.

In a cdma2000 1x system, a remote station exists in either an Idle Mode, wherein the mobile station is not maintaining a call but is ready to receive a call, or an Active Mode, wherein the mobile station is maintaining a call. In the Active Mode, the remote station can enter a sub-state called a Control-Hold Mode, wherein the fundamental channel that would normally operate in the Active Mode is replaced by a data control channel (DCCH) with a gated reverse link pilot. In this version of the Control-Hold Mode, the remote station neither sends nor receives user data traffic. The remote station only sends or receives signaling messages on the control channels.

The present embodiments are directed to an improved Control-Hold Mode that is designed to reduce the processing requirements of the remote station. The improved Control-Hold Mode is a state that a remote station can enter so that the remote station can cease monitoring various forward link channels and cease transmitting on various reverse link channels, without entering the Idle Mode. Entering the Idle Mode is not desirable because a remote station that enters the Idle Mode must release communication channels that have already been set up with the base station. In order to re-enter the Active Mode, the remote station would need to re-establish communication channels, which could be time consuming.

Attributes of the improved Control-Hold Mode are as follows:

1. The forward secondary packet data control channel (F-SPDCCH) is not monitored.
2. The forward primary packet data control channel (F-PPDCCH) is not monitored.
3. The packet data channel (PDCH) is not monitored.
4. The forward acknowledgment channel (F-ACKCH) is not monitored.
5. The reverse acknowledgment channel (R-ACKCH) is turned off.
6. The reverse channel quality indicator channel (R-CQICH) is gated off at system defined duty cycles, such as 0, $\frac{1}{16}$, $\frac{1}{8}$, $\frac{1}{4}$, and $\frac{1}{2}$.
7. The reverse pilot channel (R-PICH) is gated off at system defined duty cycles.
8. The reverse data control channel (R-DCCH) is maintained at a discontinuous transmission mode.
9. The modified forward common assignment channel (F-CACH) is monitored continuously.
10. Every base station in the active set of the remote station maintains a forward common power control channel (F-CPCCH) sub-channel for the remote station. The F-CPCCH sub-channel is gated off at the same rate as the reverse pilot channel (R-PICH).
11. Maintaining a power control loop between the remote station and a base station using the F-CPCCH and the R-PICH. Or alternatively, maintaining a power control loop between the remote station and a base station using the F-CPCCH and a R-Power control sub-channel.

Due to the intricate interactions between the various data traffic channels, control channels and feedback channels in a variety of situations such as "hand-off" and inter-BTS cell switching, the problem of implementing the improved Control-Hold mode is non-trivial. A term "hand-off" refers to the process of updating the "active set" in the remote station. Inter-BTS cell switching refers to the process of exchanging one serving sector of a base station or BTS to a serving sector of another BTS.

Figure 2:
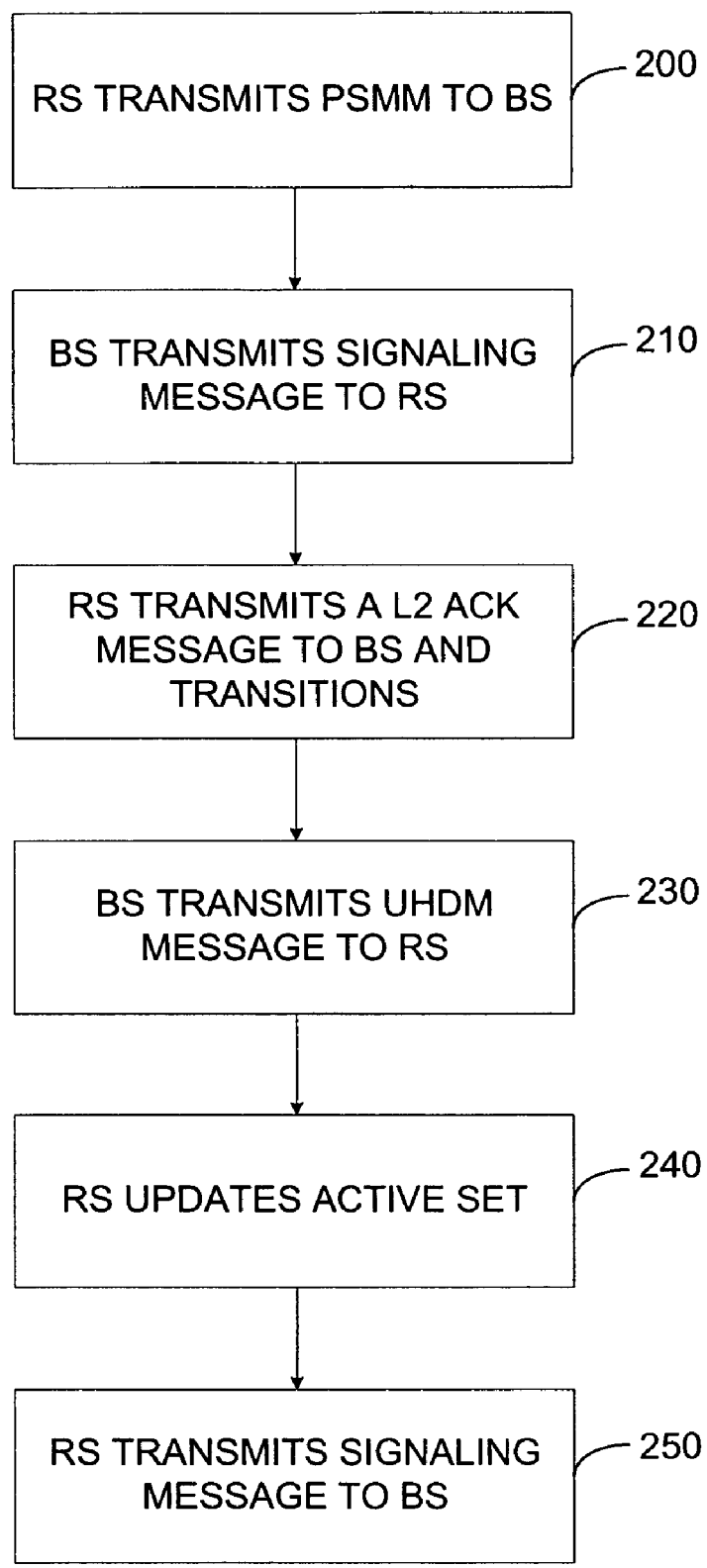
FIG. 2 is a flowchart of a hand-off procedure for a remote station in the improved Control-Hold Mode.

FIG. 2 is a flowchart of a hand-off procedure in the improved Control-Hold Mode. A processor and a memory element can be configured to execute instructions for performing the hand-off procedure. The general practice for performing hand-offs identifies the transmission energy levels of signals (usually pilot signals) received from base station candidates and then classifying the base station candidates into at least four sets. Of these sets, the active set is of interest in the embodiments described herein. In the Idle Mode, the active set is the set containing the serving base station for the remote station. In the Active Mode, the active set is the set containing all base stations from which information is being actively demodulated and decoded by the remote station.

At step 200, the remote station transmits a pilot strength measurement message (PSMM) on the R-DCCH to a base station.

At step 210, the base station transmits a signaling message to the remote station, wherein the signaling message triggers a transition of the remote station from the improved Control-Hold Mode to the Active Mode. The signaling message should be transmitted in an assured manner, such as possible when transmitting a Resource Allocation Mini-Message on the F-CACH.

At step 220, the remote station transmits a Layer 2 acknowledgment message on the R-DCCH to the base station and transitions into the Active Mode from the improved Control-Hold Mode.

At step 230, the base station transmits a Universal Hand-Off Direction Message (UHDM) to the remote station on the F-PDCH. The UHDM message carries information that allows the remote station to update the active set.

At step 240, the remote station updates the active set as directed by the UHDM message and then transitions from the Active Mode to the improved Control-Hold Mode. The transition time from the Active Mode to the improved Control-Hold Mode in this step can be a system-defined parameter that is carried by the UHDM message. Alternatively, the transition time can be a predetermined duration stored by the remote station.

At step 250, the remote station transmits a signaling message to the base station, wherein the signaling message is for acknowledging the receipt of the UHDM message. In one embodiment, the signaling message can be a Hand-off Completion Message transmitted on the R-DCCH.

Figure 3:
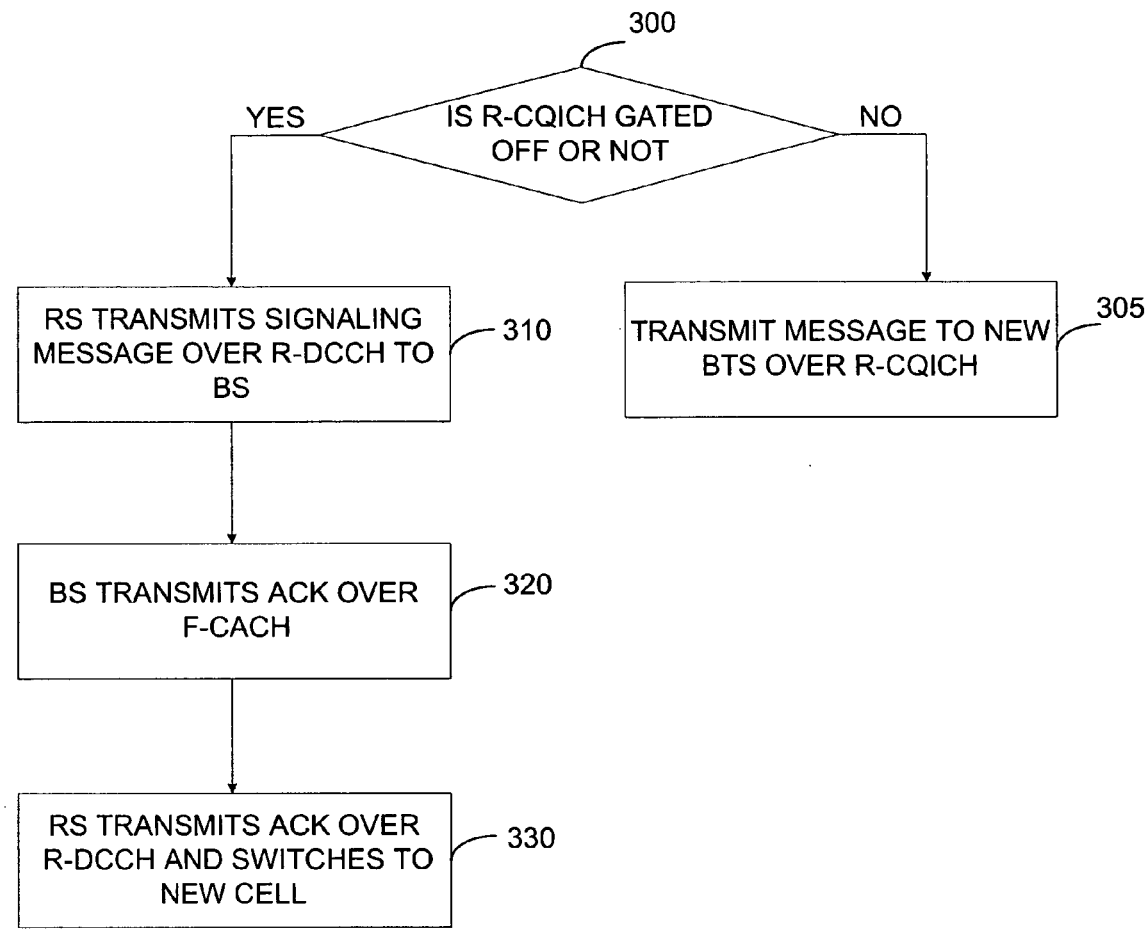
FIG. 3 is a flowchart of an inter-BTS cell switching procedure for a remote station in the improved Control-Hold Mode.

FIG. 3 is a flowchart of an inter-BTS cell switching procedure that can be implemented when the remote station is in the improved Control-Hold Mode. A processor and a memory element can be configured to execute instructions for performing the procedure. At step 300, the remote station determines whether the R-CQICH is completely gated off or not. If the R-CQICH is not completely gated off, then at step 305, the remote station transmits a message on the R-CQICH to the target BTS.

At step 310, if the R-CQICH is completely gated off, then the remote station transmits a signaling message on the R-DCCH to a base station, wherein the signaling message carries information about the readiness of the remote station to switch to the cell of another BTS.

At step 320, the base station transmits a signaling message that acknowledges the message transmitted at step 310. The signaling message can be carried on the F-CACH.

At step 330, the remote station transmits an acknowledgement message on the R-DCCH and switches to the new cell.

The previous embodiments describe the procedures that can be performed by the remote station while in the improved Control-Hold Mode. The embodiments that follow describe procedures that can be followed for transitioning out of the improved Control-Hold Mode. In one procedure, the transition from the improved Control-Hold Mode to the Active Mode is initiated by the remote station. In another procedure, the transition from the improved Control-Hold Mode to the Active Mode is initiated by the base station.

Figure 4:
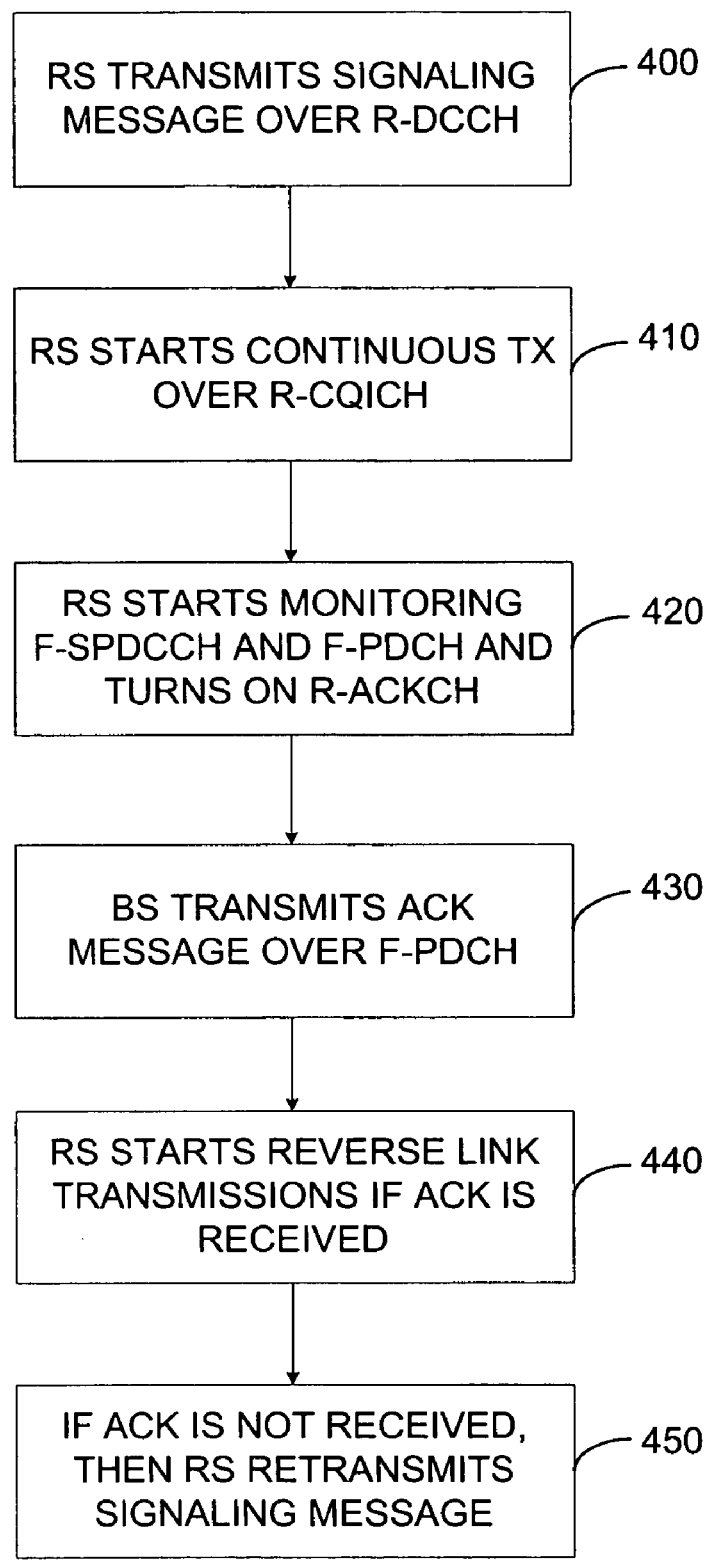
FIG. 4 is a flowchart for transitioning from the improved Control-Hold Mode to the Active Mode, wherein the procedure is instigated by a remote station.

FIG. 4 is a flowchart describing a procedure that can be followed when the remote station initiates a transition. A processor and a memory element can be configured to execute instructions for performing the procedure. At step 400, the remote station transmits a signaling message over the R-DCCH.

At step 410, the remote station starts transmitting continuously on the R-CQICH.

At step 420, the remote station starts monitoring the F-SPDCCH and the F-PDCH and turns on the R-ACKCH. In one embodiment, the transmission power of the remote station is set based on the power controlled reverse pilot and a predetermined traffic-to-pilot (T/P) ratio.

At step 430, the base station that is targeted by the remote station transmits an acknowledgment message to the remote station over the F-PDCH. Alternatively, the acknowledgement message, which contains a medium access control identifier MAC_ID, can be transmitted over the F-CACH.

At step 440, after receiving the acknowledgment from the target base station, the remote station starts transmitting on the reverse link. If the remote station does not receive the acknowledgment from the base station within a predetermined time period, then at step 450, the remote station retransmits the signaling message using the R-DCCH.

Figure 5:
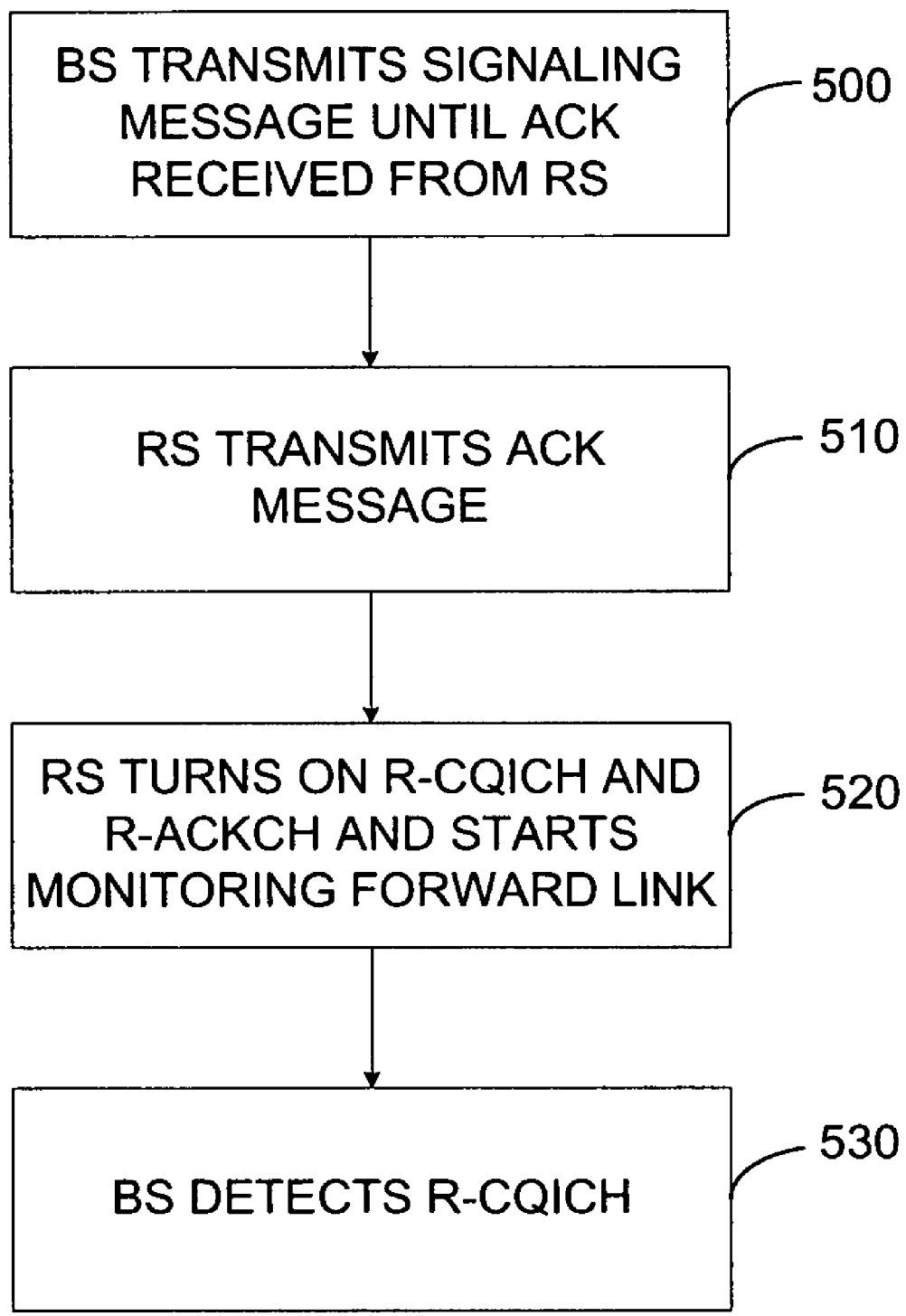
FIG. 5 is a flowchart for transitioning from the improved Control-Hold Mode to the Active Mode, wherein the procedure is instigated by a base station.

FIG. 5 is a flowchart illustrating a procedure for transitioning from an improved Control-Hold Mode to an Active Mode that can be implemented when a base station is the initiating party. A processor and a memory element can be configured to execute instructions for performing the procedure. At step 500, the base station transmits a signaling message to a target remote station. The signaling message includes the MAC_ID and is sent over a F-CACH.

The transmission power of the F-CACH is based on a maintained power control bit power level. As noted earlier, a power control loop between the remote station and the base station is maintained while the remote station is in the improved Control-Hold Mode.

At step 510, the target remote station transmits an acknowledgment message over the R-DCCH once the signaling message is received.

At step 520, the target remote station turns on the R-CQICH and R-ACKCH and starts monitoring the F-SPDCCH and F-PDCH.

At step 530, the base station detects transmissions on the newly activated R-CQICH and schedules data transmissions to the target remote station accordingly. If the base station does not receive the acknowledgment transmitted from the remote station at step 510, the base station continues to transmit the signaling message until such an acknowledgment is received.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for updating an active set when a remote station is in an improved Control-Hold Mode, comprising:
   means for transmitting a pilot strength measurement to a base station;
   means for receiving a signaling message from the base station;
   means for transitioning from the improved Control-Hold Mode to an Active Mode, wherein the transitioning is triggered by the signaling message;
   means for receiving an acknowledgment message with update information from the base station;
   means for updating the active set with the update information from the base station; and
   means for transitioning from the Active Mode to the Control-Hold Mode.

2. An apparatus for a remote station to switch sectors in a base station while the remote station is in a Control-Hold Mode, comprising:
   means for determining whether a channel quality indicator channel is presently gated off;
   means for transmitting a message on the channel quality indicator channel to a different sector if the channel quality indicator channel is not completely gated off;
   processing means, operative when the channel quality indicator channel is completely gated off, comprising:
   means for transmitting a signaling message on a data control channel to the base station;
   means for receiving a forward link acknowledgment message on a common assignment channel;
   means for switching to a different sector; and
   means for transmitting a reverse link acknowledgment message on the data control channel.

3. An apparatus for transitioning from an improved Control-Hold Mode to an Active Mode, wherein the transitioning is initiated by a remote station, the method comprising:
   means for transmitting a signaling message over a reverse data control channel to a base station while in the improved Control-Hold Mode;
   means for staffing continuous transmissions over a channel quality indicator channel to the base station;
   means for starting the monitoring of a forward packet data channel and an associated control channel;
   means for receiving an acknowledgment signal over the forward packet data channel; and
   means for staffing reverse link transmissions in accordance with the Active Mode.

4. An apparatus for transitioning a remote station from an improved Control-Hold Mode to an Active Mode, wherein the transitioning is initiated by a base station, the method comprising:
   means for transmitting a signaling message over a forward common assignment channel to the remote station, whereupon the signaling message is repeatedly transmitted until an acknowledgment signal is received from the remote station;
   means for transmitting an acknowledgment message over a reverse data control channel to the base station from the remote station;
   means for activating at least two feedback channels at the remote station; and
   means for starting the monitoring of a forward packet data channel and associated control channel at the remote station.

* * * * *